United States Patent
Anspach et al.

(10) Patent No.: US 8,741,085 B2
(45) Date of Patent: Jun. 3, 2014

(54) METHOD OF MAKING A RESILIENT FLOOR TILE

(75) Inventors: Kean M. Anspach, Quarryville, PA (US); Thomas C. Bair, York, PA (US); John R. Eshbach, Jr., Marietta, PA (US)

(73) Assignee: AWI Licensing Company, Wilmington, DE (US)

( * ) Notice: Subject to any disclaimer, the term of this patent is extended or adjusted under 35 U.S.C. 154(b) by 169 days.

(21) Appl. No.: 12/854,942

(22) Filed: Aug. 12, 2010

(65) Prior Publication Data

US 2011/0041989 A1 Feb. 24, 2011

Related U.S. Application Data

(60) Provisional application No. 61/235,733, filed on Aug. 21, 2009.

(51) Int. Cl.
*B32B 38/04* (2006.01)

(52) U.S. Cl.
USPC ........... 156/222; 156/253; 156/258; 156/267; 264/153; 264/160; 264/163

(58) Field of Classification Search
None
See application file for complete search history.

(56) References Cited

U.S. PATENT DOCUMENTS

| | | | |
|---|---|---|---|
| 3,616,144 A | 10/1971 | Kenney | |
| 4,219,598 A | 8/1980 | Noma et al. | |
| 4,312,686 A | 1/1982 | Smith et al. | |
| 4,614,556 A | 9/1986 | Fry et al. | |
| 4,678,528 A | 7/1987 | Smith et al. | |
| 4,772,500 A | 9/1988 | Stroppiana | |
| 4,804,429 A | 2/1989 | Appleyard et al. | |
| 5,077,112 A | 12/1991 | Hensel et al. | |
| 5,188,876 A | 2/1993 | Hensel et al. | |
| 5,962,111 A * | 10/1999 | Rach | 428/195.1 |
| 6,333,076 B1 | 12/2001 | Sigel et al. | |
| 6,440,500 B1 | 8/2002 | Sigel et al. | |
| 6,783,720 B2 * | 8/2004 | Johns et al. | 264/320 |
| 7,550,192 B2 | 6/2009 | Dempsey et al. | |
| 2006/0043633 A1 | 3/2006 | Dempsey | |
| 2006/0083902 A1 | 4/2006 | Jarosz | |
| 2008/0119604 A1 | 5/2008 | Greenawalt | |
| 2009/0186197 A1 | 7/2009 | Dempsey | |
| 2010/0146895 A1 | 6/2010 | Dempsey | |

* cited by examiner

*Primary Examiner* — Barbara J Musser
(74) *Attorney, Agent, or Firm* — Michael U. Lee

(57) ABSTRACT

A resilient floor tile includes a base layer, a film layer, a decorative film layer, and a topcoat. The resilient floor tile has a shaped edge formed on an upper surface thereof that extends about at least a portion of a perimeter of the resilient floor tile. In order to make the resilient floor tile, a continuous sheet of a base layer is conveyed into a press die. The press die is actuated from an open position to a closed position. The continuous sheet is cut with a blade of a cutting tool of the press die to form side surfaces of the resilient floor tile when the press die is in the closed position. A shaped edge is formed on at least a portion of a perimeter of an upper surface of the resilient floor tile with a forming tool of the press die when the press die is in the closed position.

18 Claims, 7 Drawing Sheets

METHOD OF MAKING A RESILIENT FLOOR TILE

CROSS-REFERENCE TO RELATED APPLICATIONS

This application claims priority from U.S. Patent Application Ser. No. 61/235,733, filed Aug. 21, 2009, which is hereby incorporated by reference in its entirety.

FIELD OF THE INVENTION

The present invention generally relates to a resilient floor tile and more particularly to resilient floor tile having a shaped edge and a method of making the same.

BACKGROUND OF THE INVENTION

Resilient floor tiles that have the appearance of ceramic or natural tile are a popular alternative to the more expensive ceramic and natural floor tiles in the marketplace. A few ways in which the resilient floor tiles can be formed to have the appearance of ceramic or natural tile include forming the resilient floor tiles such that the resilient floor tiles are groutable, providing the resilient floor tiles with a shaped edge about a perimeter thereof, and/or embossing the resilient floor tiles such that the resilient floor tiles have a similar look and/or feel as ceramic or natural tile.

Although there are many known methods for manufacturing resilient floor tiles having the above-described characteristics, there still remains a need to simplify the manufacturing process and reduce the expense associated therewith. For example, U.S. Pat. No. 7,550,192 teaches a multi-step process for forming resilient floor tiles that includes forming a plurality of resilient floor tile blanks, stacking the resilient floor tile blanks on a pallet, transporting the pallet of resilient floor tile blanks to a destacker, feeding the resilient floor tile blanks one at a time onto a conveyor belt, conveying the resilient tile blanks through a pre-heated oven, and then finally cutting and molding the resilient floor tile blanks to form the resilient floor tiles.

Not only is the above-described process time consuming, which adds to the overall expense and efficiency of manufacturing the resilient floor tiles, but also the process requires unnecessary handling of the resilient floor tiles, which can lead to increases in manufacturing defects. It is therefore desirable to develop a method of manufacturing resilient floor tiles having the appearance of ceramic or natural tile wherein the resilient floor tiles can be manufactured in a continuous process thereby simplifying the manufacturing process, increasing efficiency, and reducing expense.

BRIEF SUMMARY OF THE INVENTION

The invention relates to a method of making a resilient floor tile, comprising: conveying a continuous sheet of a base layer into a press; actuating the press die from an open position to a closed position; cutting the continuous sheet with a blade of a cutting tool of the press die to form side surfaces of the resilient floor tile when the press die is in the closed position; and forming a shaped edge on at least a portion of a perimeter of an upper surface of the resilient floor tile with a forming tool of the press die when the press die is in the closed position.

DETAILED DESCRIPTION OF THE EMBODIMENT(S)

Figure 1:
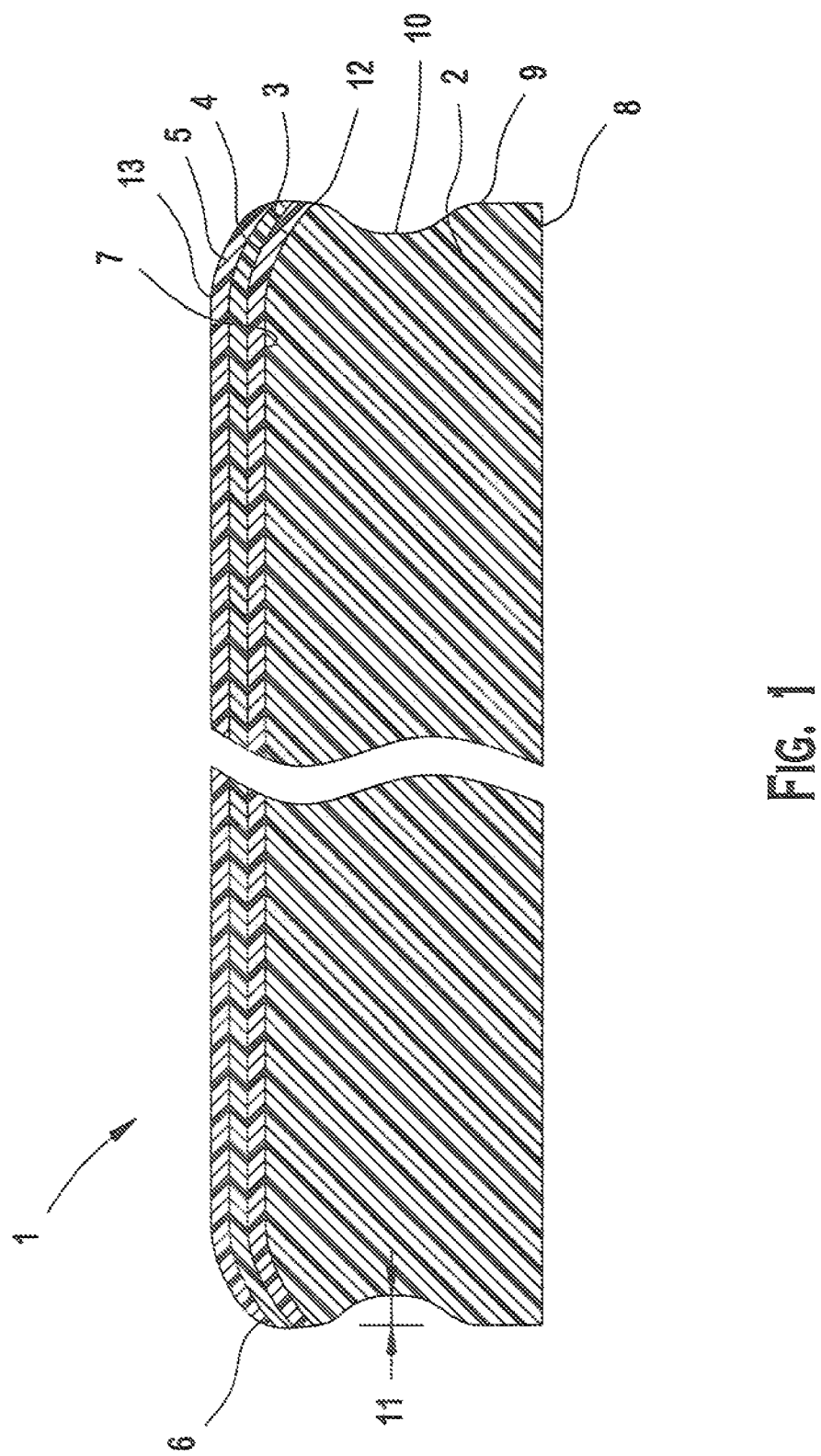
FIG. 1 is a sectional view of a resilient floor tile according to an embodiment of the present invention.

FIG. 1 shows a resilient floor tile 1 according to an embodiment of the present invention. As shown in FIG. 1, the resilient floor tile 1 comprises a base layer 2, a film layer 3, a decorative film layer 4, and a topcoat 5. The base layer 2 has a top surface 7 and a bottom surface 8. Substantially vertical side walls 9 extend between the top surface 7 and the bottom surface 8. Each of the side walls 9 has a recessed portion 10 formed in a side thereof. The recessed portion 10 is substantially concave in shape and has a depth 11, for example, of up to about 20 mils and, more preferably, about 15-20 mils. Although the side walls 9 shown and described herein are provided with the recessed portion 10, it will be appreciated by those skilled in the art that the side walls 9 may alternatively be formed without the recessed portion 10 by varying the composition of the base layer 2 and/or the method of making the resilient floor tile 1.

In the embodiment shown and described herein, the base layer 2 comprises a binder, a filler, and an optional pigment. The binder may be, for example, a polymeric resin, such as a vinyl resin, mixed with a plasticizer and a stabilizer. The polymeric resin may include, for example, a homoploymer, a copolymer or a combination thereof. The homopolymer may include, for example, polyvinyl chloride, polyvinyl acetate, polyvinyl propionate, polyvinyl butyrate, polymerized vinylidene chloride, polymerized acrylic acid, polymerized ethyl acrylate, polymerized methyl acrylate, polymerized propyl acrylate, polymerized butyl acrylate, polyethylene, polypropylene, or mixtures thereof. The copolymer may include, for example, polyvinyl chloride/polyvinyl acetate, vinylidene chloride/vinyl chloride, methyl methacrylate/vinyl chloride, methyl acrylate/ethyl acrylate, ethyl acrylate/butyl acrylate copolymer, ethylene propylene copolymers, ethylene styrene copolymers, or mixtures thereof.

The plasticizer may include, for example, ester type plasticizers, such as tributyl phosphate, dioctyl phthalate, dipropylene glycol dibenzoate, phenyl phosphate, dibutyl tartrate, amyl tartrate, butyl benzyl benzoate, dibutyl sebacate, dioctyl adipate, or didecyl adipate, rubbery plasticizers, such as butadiene-styrene copolymer, butadiene-acrylonitrile copolymer, or ethylene vinyl acetate, or other materials which function as plasticizers, such as epoxidized drying oils and aromatic hydrocarbon condensates. Where certain flexible soft vinyl resins are used, such as polymers containing large proportions of ethyl acrylate, no plasticizer may be needed. The stabilizer may include, for example, a mixed metal stabilizer, such as a calcium-zinc composition.

The filler may include, for example, an inorganic or organic material, such as calcium carbonate, magnesium carbonate, silica, diatomaceous earth, dolomite, clay, or mixtures thereof. The filler may be a recyclable or renewable material. The optional pigment may include, for example, titanium dioxide, iron oxides, phthalocyanine blue, phthalocyanine green, azo red, benzidene yellow, carbon black, or mixtures thereof. The base layer 2 may have a thickness of about 95-166 mils.

The formulation of the base layer 2 contains, for example, less than about 36% weight of the binder, preferably less than about 25% weight of the binder, and more preferably about 20-25% weight of the binder. Additionally, the base layer 2 contains for example, at least about 64% weight of the filler, preferably at least about 75% weight of the filler, and more preferably about 75-80% weight of the filler. Table 1 illustrates several examples of formulations for the base layer 2.

TABLE 1

Base Layer Formulations

| Component | EX-1 Percent by Weight | EX-2 Percent by Weight | EX-3 Percent by Weight |
| --- | --- | --- | --- |
| Homopolymer | 11.0 | 12.1 | 10.05 |
| Copolymer | 3.8 | 4.2 | 4.01 |
| Plasticizer | 4.9 | 5.4 | 5.68 |
| Stabilizer | 0.3 | 0.3 | 0.27 |
| Filler | 78.7 | 76.7 | 78.87 |
| Pigment | 1.3 | 1.3 | 1.12 |
| Total | 100 | 100 | 100 |

The film layer 3 is disposed on the top surface 11 of the base layer 2. The film layer 3 has a thickness of about 2-4 mils. The film layer 3 may consist, for example, of a polymeric vinyl film. In the embodiment shown and described herein, the film layer 3 is a substantially opaque white film. It will be appreciated by those skilled in the art, however, that the film layer 3 may alternatively be clear or provided with a printed ink pattern on a surface thereof. Additionally, the film layer 3 could be omitted and/or a printed pattern could be provided directly on the top surface 7 of the base layer 7.

The decorative film layer 4 is disposed on a top surface of the film layer 3. The decorative film layer 4 has a thickness of about 2-3 mils. The decorative film layer 4 may consist, for example, of a polymeric vinyl film. In the embodiment shown and described herein, the decorative film layer 4 is provided with a printed ink pattern on a back surface thereof. The decorative film layer 4 is positioned on the film layer 3, such that the printed ink pattern faces the film layer 3. It will be appreciated by those skilled in the art, however, that the decorative film layer 4 may alternatively be clear or provided with a printed ink pattern on a top surface thereof. Additionally, the decorative film layer 4 could be omitted. The decorative film layer 4 may also optionally be mechanically and/or chemically embossed. Because mechanical and chemical embossing of film layers is well known in the art, further description thereof has been omitted.

The topcoat 5 is provided on a top surface of the decorative film layer 4. The topcoat 5 has a thickness of about 1-2 mils. The topcoat 5 may be, for example, a radiation curable coating, such as acrylated urethane or acrylated polyester. Alternatively, the topcoat 5 may be a radiation curable biobased coating comprising a biobased component. The biobased component may be, for example, a biobased polyol, acylated biobased polyol, or biobased resin derived, for example, from renewable and/or biobased materials, such as plant oils, polyester, polyester-ether, vegetable oils, corn, cellulose, starch, sugar, or sugar alcohols. The topcoat 5 may also comprise additional components, such as particles, which provide performance enhancement and/or texture to the topcoat 5. The particles may include, for example, aluminum oxide particles, nylon particles, and the like. It will be appreciated by those skilled in the art that although the topcoat 5 is shown and described herein as being a single layer topcoat that the topcoat 5 could alternatively be a multiple layer topcoat. Additionally, the resilient floor tile 1 could be provided without the topcoat 5.

As shown in FIG. 1, the resilient floor tile 1 has a shaped edge 6 formed at an upper surface 13 of the resilient floor tile 1 that extends about a perimeter thereof. In the embodiment shown and described herein, the shaped edge 6 extends around the entire perimeter of the resilient floor tile 1. However, it will be appreciated by those skilled in the art that the shaped edge 6 could also extend around a portion of the perimeter of the resilient floor tile 1. Additionally, in the embodiment shown and described herein, the shaped edge 6 is substantially rounded or convex. However, it will be appreciated by those skilled in the art that the shaped edge 6 could have other geometric configurations, for example, the shaped edge 6 could be beveled, stepped, scalloped, or concave or could consist of a combination of geometric configurations. The film layer 3, decorative film layer 4, and topcoat 5 extend over at least a portion of the shaped edge 6, and preferably, over the entirety of the shaped edge 6. In other words, it is preferable that the film layer 3, decorative film layer 4, and topcoat 5 extend to an end portion 12 of the shaped edge 6 where the shaped edge 6 meets the side wall 8 of the base layer 2.

In the embodiment shown and described herein, the resilient floor tile 1 has a substantially square shape and a thickness of about 100-175 mils. It will be appreciated by those skilled in the art, however, that the resilient floor tile 1 is not limited to the structure shown and described herein. For example, the resilient floor tile 1 may comprise additional base layers, film layers, decorative film layers, and or topcoats. Additionally, the thickness and the geometrical configuration of the resilient floor tile 1 may be varied depending on the desired structural characteristics of the resilient floor tile 1. For example, the thickness of the base layer 2, the film layer 3, the decorative film layer 4, and/or the topcoat 5 may be varied. Additionally, the shape of the resilient floor tile 1 may alternatively be rectangular, round, oval, triangular, or the like.

The method of making the resilient floor tile 1 according to the invention will now be described in greater detail. The method of making the resilient tile 1 is a continuous process 20, which is shown in part in FIG. 2. The continuous process begins with the binder, the filler, and the pigment being individually weighed and blended together at an ambient temperature of about 60-100 degrees Fahrenheit for about 5-10 minutes. The blend of the binder, the filler, and the pigment are then mixed in a continuous mixer at a temperature of about 350-400 degrees Fahrenheit for about 15-30 seconds to form a fused mixture. The fused mixture is then conveyed to a two roll mill. Using the two roll mill, the fused mixture is rolled out into a continuous sheet 21 that forms the base layer 2 of the resilient floor tile 1.

As the continuous sheet 21 exits the two roll mill, the continuous sheet 21 is deposited onto a conveyor belt 22, which supports the continuous sheet 21 as the continuous sheet 21 is conveyed to a first processing station where the film layer 3 is laminated to the top surface 7. The conveyor belt 22 then conveys the continuous sheet 21 to a second processing station where the decorative film layer 4 is laminated to the film layer 3. Next, the conveyor belt 22 conveys the continuous sheet 21 to a third processing station where the continuous sheet 21 is mechanically embossed. From the time the continuous sheet 21 exits the two roll mill until after the continuous sheet 21 is mechanically embossed, the continuous sheet 21 is maintained at a constant temperature of about 300-320 degrees Fahrenheit.

Figure 2:
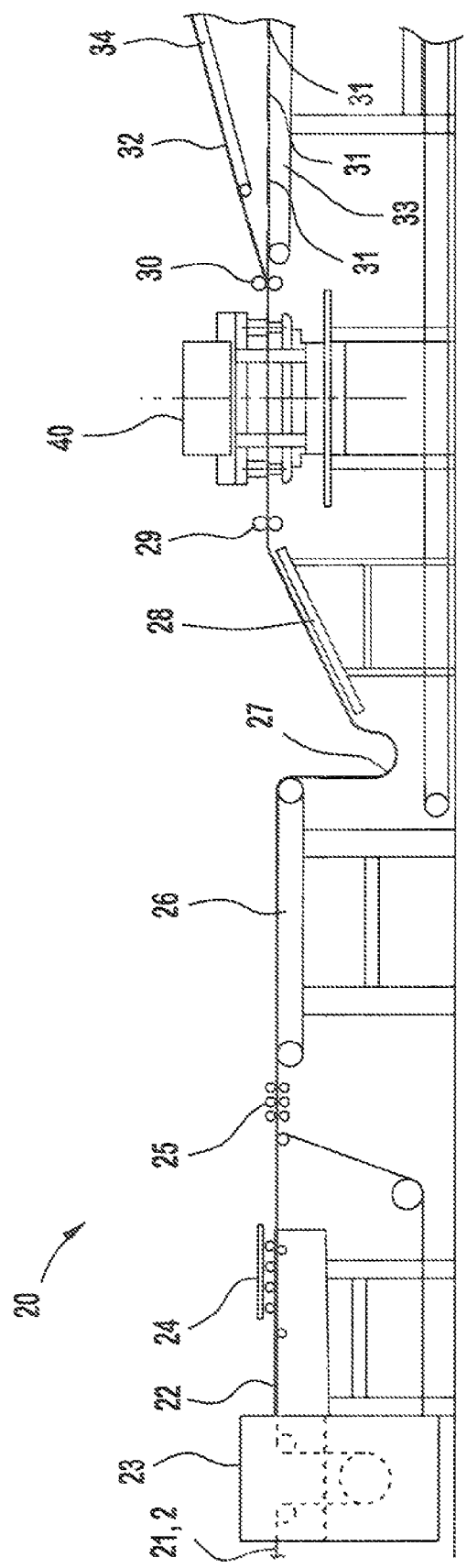
FIG. 2 is a schematic diagram of part of a continuous process for making the resilient floor tile of FIG. 1.

As shown in FIG. 2, after being mechanically embossed, the conveyor belt 22 conveys the continuous sheet 21 through a water bath 23. The water bath 23 consists, for example, of a chamber that is flooded with a coolant, such as water. The water bath 23 cools the continuous sheet 21 to a temperature of about 135-145 degrees Fahrenheit. After exiting the water bath 23, the conveyor belt 22 conveys the continuous sheet 21 to a water removal station 24. At the water removal station 24, the coolant is removed from the continuous sheet 21, as well as the conveyor belt 22, by blowing air onto the upper surface of the continuous sheet 21. After passing through the water removal station 24, the continuous sheet 21 is transferred from the conveyor belt 22 to a press die conveyor 26. As the continuous sheet 21 is transferred from the conveyor belt 22 to the press die conveyor 26, the continuous sheet 21 passes through a drying station 25. The drying station 25 blows air onto the upper surface of the continuous sheet 21 while a lower surface of the continuous sheet 21 is drawn across a squeegee. Additionally or alternatively, air could be blown onto the lower surface of the continuous sheet 21.

It will be appreciated by those skilled in the art that the continuous sheet 22 could alternatively be processed on a drum line instead of on the conveyor belt 22. For example, the application of the film layer 3, the application of the decorative film layer 4, the mechanical embossing, and/or the cooling of the continuous sheet 21 could take place on the drum line. The method of processing resilient floor tiles on drum lines is well known in the art and is shown and described, for example, in U.S. Pat. Nos. 4,804,429, 6,333,076, and 6,440,500, which are hereby incorporated by reference in their entireties.

After exiting the drying station 25, the continuous sheet 21 is transferred onto the press die conveyor 26, which conveys the continuous sheet 21 into a processing loop 27. The continuous sheet 21 is then conveyed up an infeed support 28 and into a press die 40 by infeed rollers 29 and outfeed rollers 30. The processing loop 27 can vary in size and compensates for variances in processing times between the press die 40 and the processing steps prior thereto. When the continuous sheet 21 reaches the press die 40, the continuous sheet 21 is between about 130-140 degrees Fahrenheit, and more preferable about 135 degrees Fahrenheit.

Figure 3:
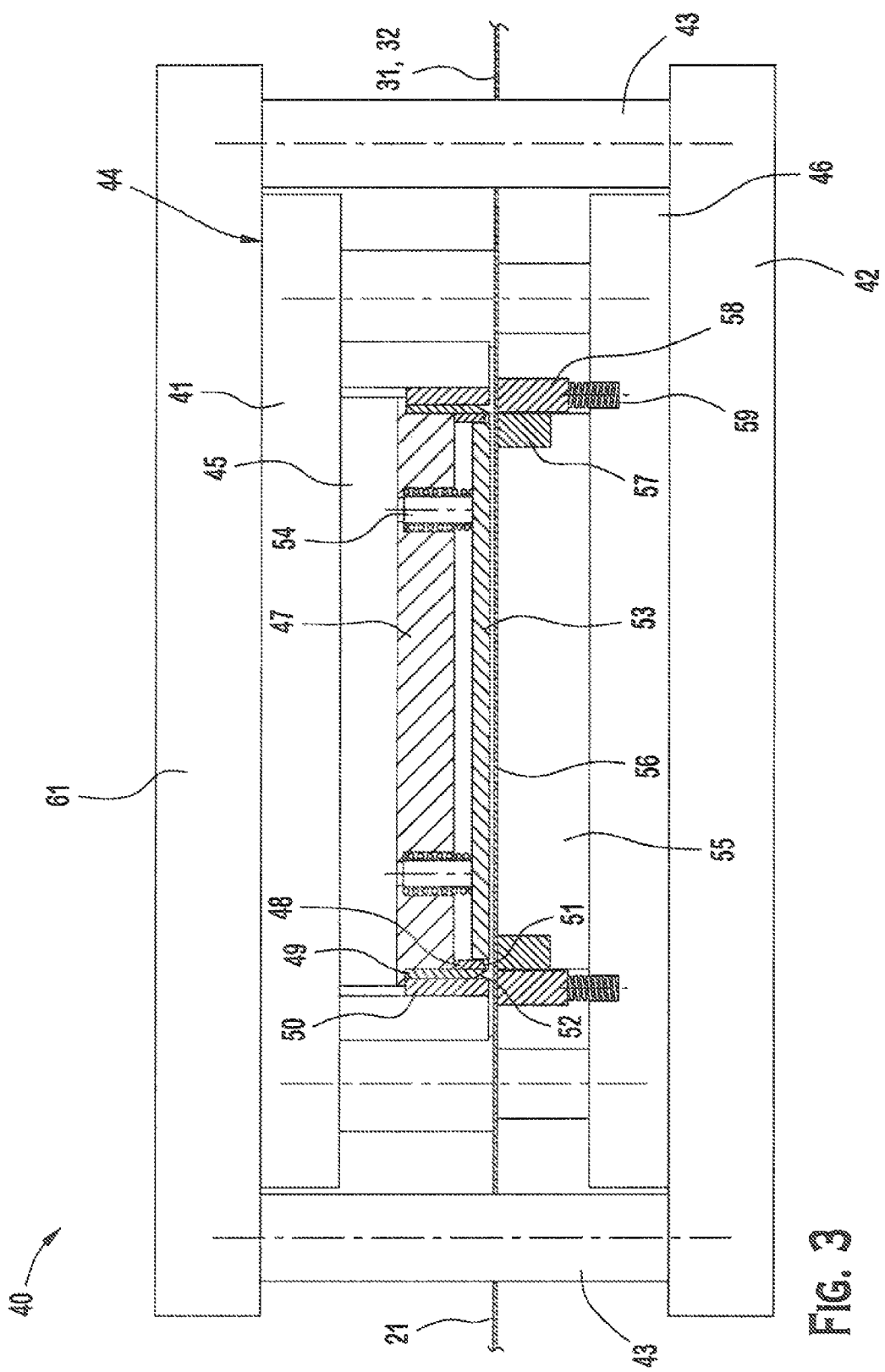
FIG. 3 is a partial sectional view of a press die containing a die assembly wherein the press die is shown in an open position.
Figure 4:
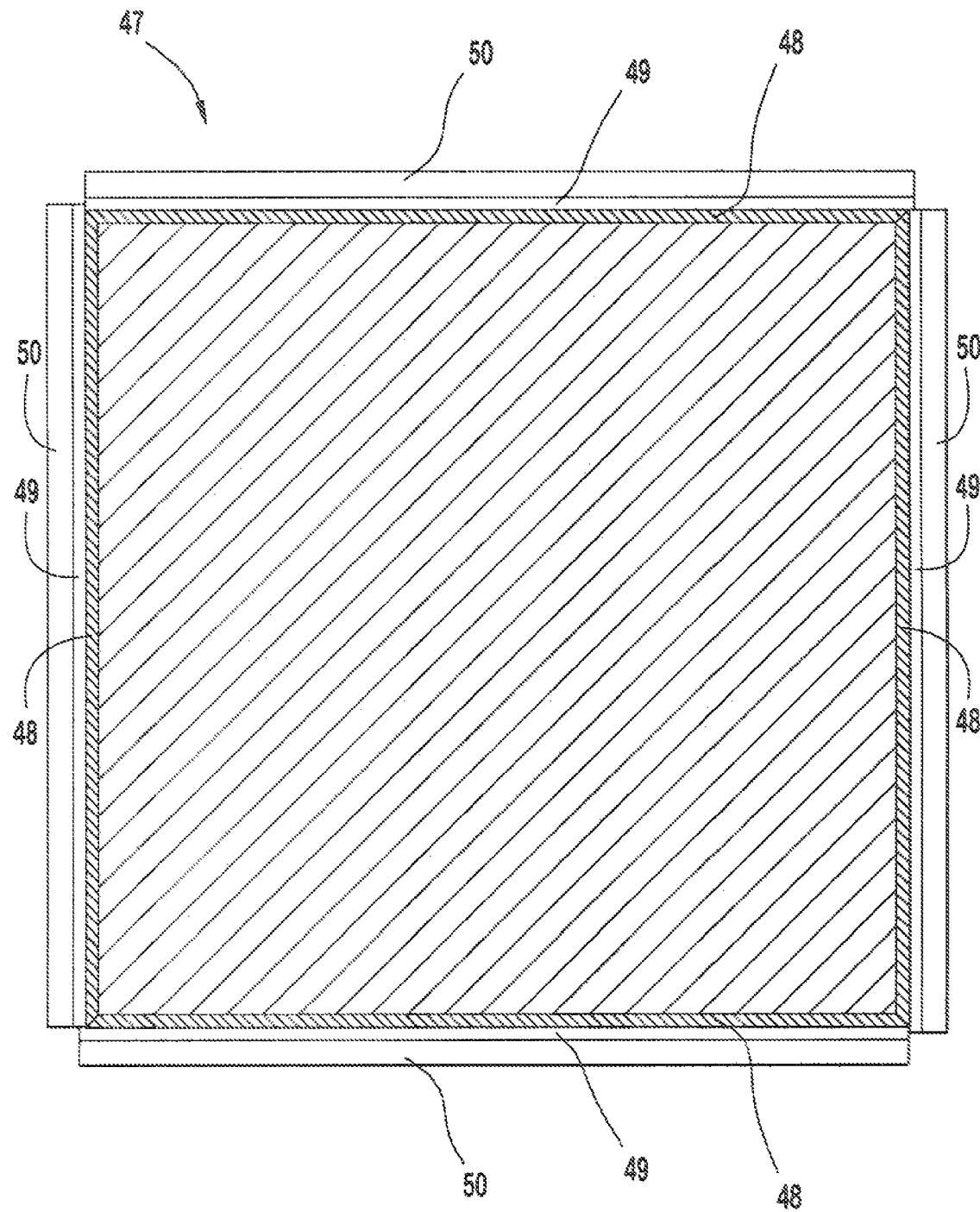
FIG. 4 is a plan view of a support block of the die assembly of FIG. 3.
Figure 5:
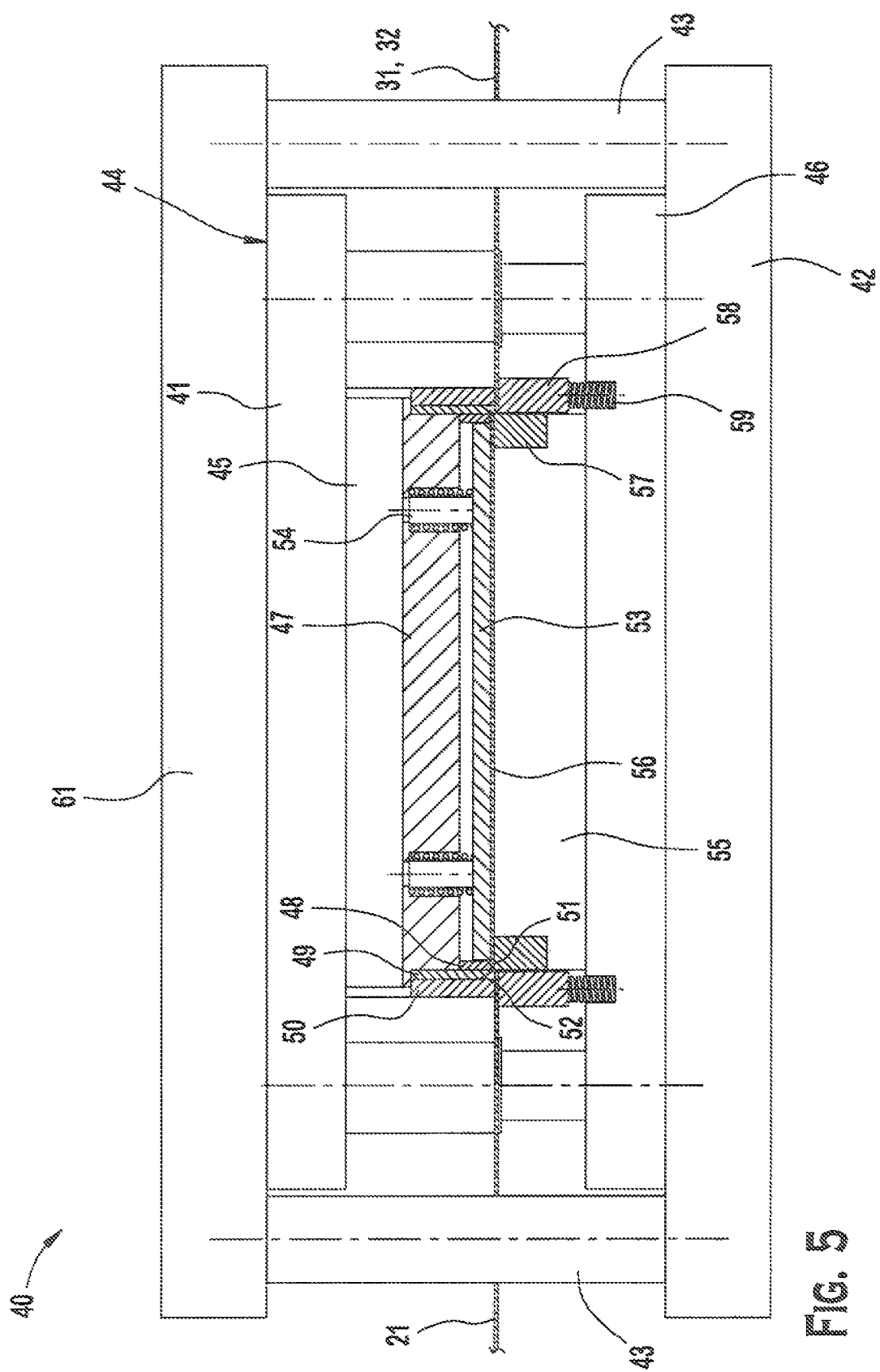
FIG. 5 is a partial sectional view of the press die containing the die assembly wherein the press die is shown in a closed position.

FIGS. 3-6 show the press die 40. The press die 40 cuts and forms the continuous sheet 21 into individual tiles 31 that form the resilient floor tiles 1. FIG. 3 shows the press die 40 in an open position, and FIG. 5 shows the press die 40 in a closed position. As shown in FIG. 3, the press die 40 includes an upper platen 61 and a lower platen 42 separated by press posts 43. The upper platen 61 is moveable with respect to the lower platen 42 along the press posts 43 via hydraulics (not shown) or, alternatively, electrical or mechanical means. A die assembly 44 is arranged between the upper platen 61 and the lower platen 42. The die assembly 44 comprises an upper die shoe 41 attached to the upper platen 61 and a lower die shoe 46 attached to the lower platen 42.

Figure 6:
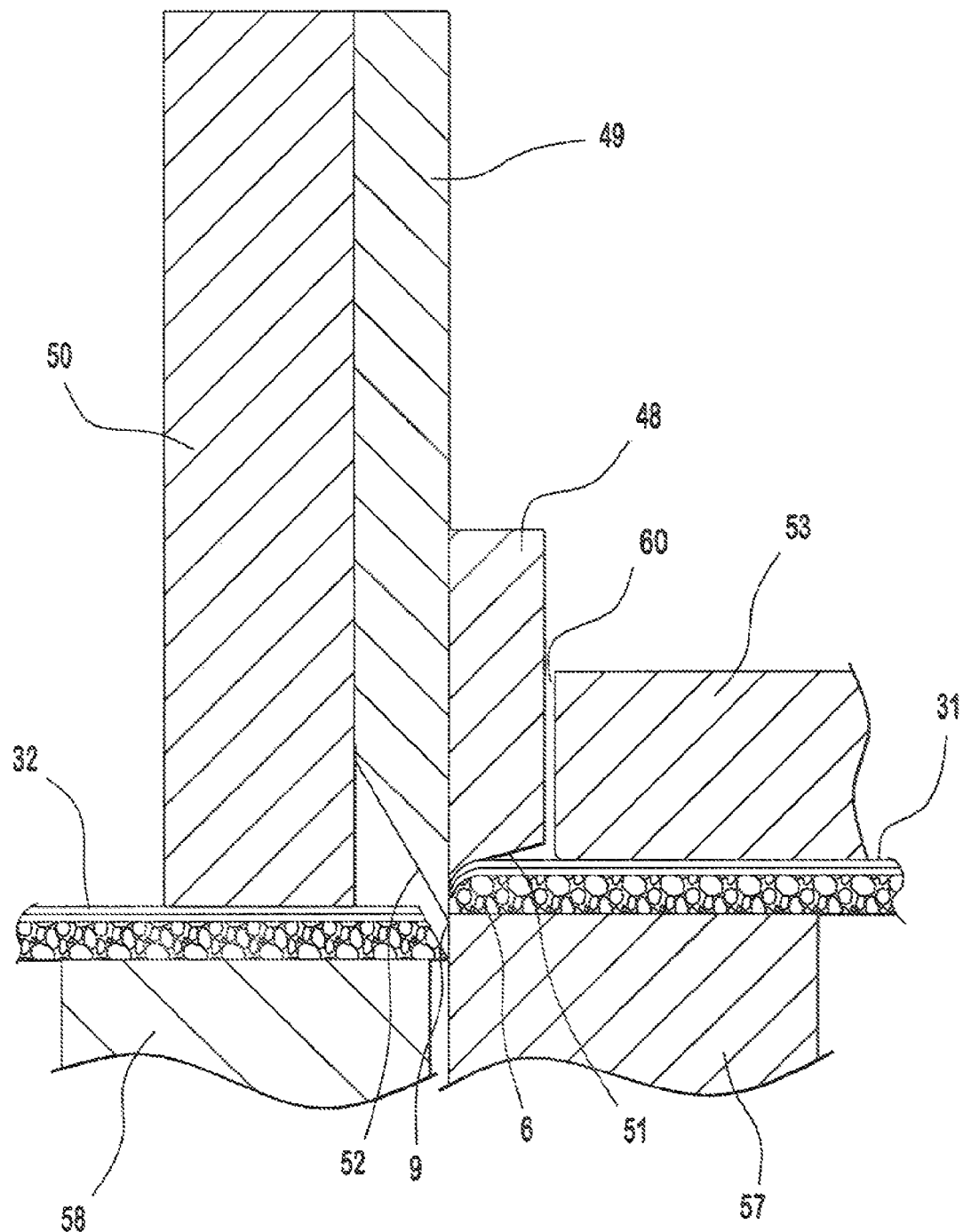
FIG. 6 is an enlarged sectional view of a cutting tool and a forming tool of the press die of FIG. 5.

An upper die member 45 is attached to the upper die shoe 41. A support block 47 is attached to the upper die member 45. The support block 47 is provided with a forming tool 48, a cutting tool 49, and a knife support block 50. As shown in FIG. 4, the upper die 47 has a substantially square shape and may be formed, for example, of a block of metal. The forming tool 48 is provided in four separate parts each being removeably attached to a side of the support block 47 substantially about a perimeter thereof. The forming tool 48 may be removeably attached to the support block 47, for example, with any known attachment mechanism (not shown), such as a screw or the like. As best shown in FIG. 6, the forming tool 48 is provided with a shaped surface 51 configured to correspond to the desired size and dimension of the shaped edge 6 of the resilient tile 1. In the embodiment shown and described herein, the shaped surface 51 is substantially rounded or convex. However, it will be appreciated by those skilled in the art that the shaped surface 51 could have other geometric configurations, for example, the shaped surface 51 could be beveled, stepped, scalloped, or concave or could consist of a combination of geometric configurations.

As best shown in FIG. 4, the cutting tool 49 is provided in four separate parts each being removeably attached to the side of the support block 47 substantially about a perimeter thereof. The cutting tool 49 is attached to the support block 47 such that the cutting tool 49 abuts the forming tool 48. The cutting tool 49 may be removeably attached to the support block 47, for example, with any known attachment mechanism (not shown), such as a screw or the like. As best shown in FIG. 6, the cutting tool 49 is provided with a substantially inclined blade 52 positioned opposite the shaped edge 51 of the forming tool 48 such that the blade 52 inclines toward the shaped edge 51 of the forming tool 48. In the embodiment shown and described herein, the blade 52 is inclined at an angle of about 30 degrees. However, it will be appreciated by those skilled in the art that the angle of the blade 52 may be varied depending on the desired configuration of the resilient floor tile 1.

As best shown in FIG. 4, the knife support block 50 is provided in four separate parts each being removeably attached to the cutting tool 49 substantially about a perimeter thereof. As best shown in FIG. 6, the knife support block 50 is attached to the cutting tool 49 such that the knife support block 50 abuts the cutting tool 49. The knife support block 50 may be removeably attached to the cutting tool 49, for example, with any known attachment mechanism (not shown), such as a screw or the like.

As shown in FIG. 3, a stripper plate 53 is attached to a bottom surface of the support block 47 in an area inside the forming tool 48. The stripper plate 53 is attached to the support block 47 via springs 54 such that the stripper plate 53 moves toward the support block 47 when the springs 54 are compressed. As best shown in FIG. 6, a clearance 60 is provided between a side of the stripper plate 53 and a side of the forming tool 48 to enable the stripper plate 53 to easily move relative thereto.

As shown in FIG. 3, a lower die 55 is attached to the lower die shoe 46. The lower die 55 has a substantially flat support surface 56 facing the support block 47. Carbides 57 form a provided perimeter of the lower die 55. Provided adjacent to the lower die 55 is a frame scrap support plate 58. The frame scrap support plate 58 is attached to the lower die shoe 46 via springs 59 such that the frame scrap support plate 58 moves away from the support block 47 when the springs 59 are compressed.

As shown in FIG. 3, when the press die 40 is in the open position, the continuous sheet 21 consisting of the base layer 2, the film layer 3, and the decorative film layer 4 is drawn into the press die 40 by the infeed rollers 28 and the outfeed rollers 29 shown in FIG. 2. As the continuous sheet 21 enters the press die 40, the continuous sheet 21 is supported on the support surface 56 of the lower die 55. When the continuous sheet 21 reaches the correct position in the press die 40, the infeed rollers 28 and the outfeed rollers 29 stop advancing the continuous sheet 21, and the press die 40 is actuated to move the press die 40 from the open position to the closed position, as shown in FIG. 5. As the support block 47 moves toward the continuous sheet 21, the blade 52 of the cutting tool 49 cuts the continuous sheet 21 to form the side walls 9 of the resilient floor tile 1 while the forming tool 48 concurrently forms the shaped edge 6 on the perimeter of the upper surface 13 of the resilient floor tile 1, as best shown in FIG. 6.

As the press die 40 moves toward the closed position, the stripper plate 53 moves toward the support block 47, as a result of the springs 54 being compressed. Additionally, as the press die 40 moves toward the closed position, the frame scrap support plate 58 moves away from the support block 47, as a result of the springs 59 being compressed. Thus, the cutting tool 49 is able to easily cut the continuous sheet 21. The frame scrap support plate 58 also supports any frame scrap 32 cut from the continuous sheet 21 during the cutting and forming of the individual tile 31. In the closed position, the press die 40 applies about 23 tons of pressure to the continuous sheet 21 for a period of about 0.25 seconds.

After the individual tile 31 is cut and formed, the press die 40 is returned to the open position. As the press die 40 is returned to the open position, the stripper plate 53 is pushed downwards and back to its original position by the springs 54. As the stripper plate 53 is pushed downwards, the stripper plate 53 eases the individual tile 31 from the forming tool 48. Also, as the press die 40 is returned to the open position, the frame scrap support plate 58 is pushed upwards by the springs 59 allowing the individual tile 31 to be positioned within the frame scrap 32 for subsequent removal from the press die 40. The infeed rollers 28 and the outfeed rollers 29 then advance the individual tile 31 and the frame scrap 32 out of the press die 40. As the individual tile 31 and the frame scrap 32 are advanced out of the press die 40, the individual tile 31 is separated from the frame scrap 32 and is conveyed onto a tile conveyor 33 while the frame scrap 32 is conveyed onto a separate scrap conveyor 34 that conveys the frame scrap 32 to a scrap recycle station. The infeed rollers 28 and the outfeed rollers 29 continue to advance the individual tile 31 and the frame scrap 32 until an uncut portion of the trailing continuous sheet 21 has been positioned in the press die 40. The press die 40 is then re-actuated to form another one of the individual tiles 31. This process is repeated for the remainder of the continuous sheet 21.

The tile conveyor 33 optionally conveys the individual tiles 31 to a brushing station. The brushing station comprises, for example, at least two rotary brushes. The rotary brushes may have a diameter, for example, of about 4.5 inches. Each of the rotary brushes is provided with a plurality of rows of bristles. Each of the bristles may have a diameter of about 60 mils and may be made, for example, from a material such as nylon. The rotary brushes are positioned such that the bristles extend substantially perpendicular to the side walls 9 of the individual tiles 31. The rotary brushes are rotated such that the bristles contact the individual tiles 31 with a downward motion. In other words, the bristles contact the upper surface 13 of the individual tiles 31 and then are rotated downward toward the bottom surface 8 of the individual tiles 31. As a result, the bristles brush the side walls 9 of the individual tiles 31 in a downward direction to correct and/or reposition any lifted corners on the individual tiles 31 and to remove loose film hairs, debris, and the like from the individual tiles 31. The individual tiles 31 may be conveyed through the brushing station such that one set of the opposing side walls 9 of the individual tiles 31 are contacted by the brushes and then the individual tiles 31 and/or the brushes can be rotated such that the other set of the opposing side walls 9 of the individual tiles 31 are contacted by the brushes.

The tile conveyor 33 then optionally conveys the individual tiles 31 to a coating station. At the coating station, the topcoat 5 is provided overtop of the decorative film layer 4 to complete the formation of the resilient floor tile 1. The topcoat 5 may be coated, for example, in a liquid or flowable form onto the decorative film layer 4 and then cured. It is known to cure the topcoat 5 by controlled exposure to radiation, such as ultraviolet or electron beam radiation. The resilient floor tile 1 is then conveyed to an inspection station and a stacking station where the resilient floor tile 1 is subsequently packaged. Alternatively, the individual tiles 31 could be conveyed by the tile conveyor 33 directly to an inspection, stacking, and/or packaging station.

Figure 7:
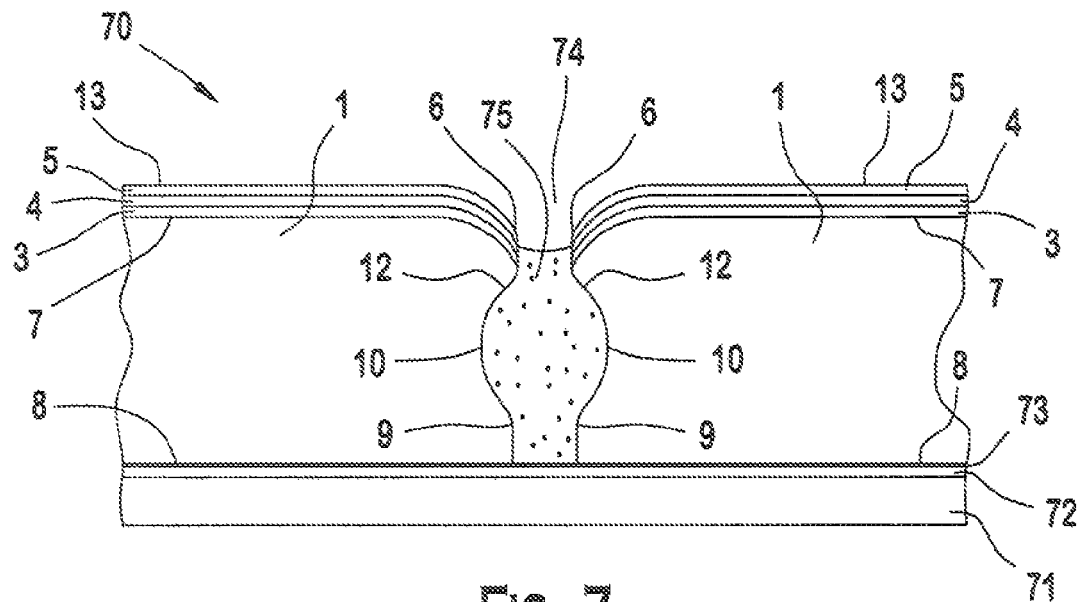
FIG. 7 is a partial plan view of a floating floor system incorporating the resilient floor tile.
Figure 8:
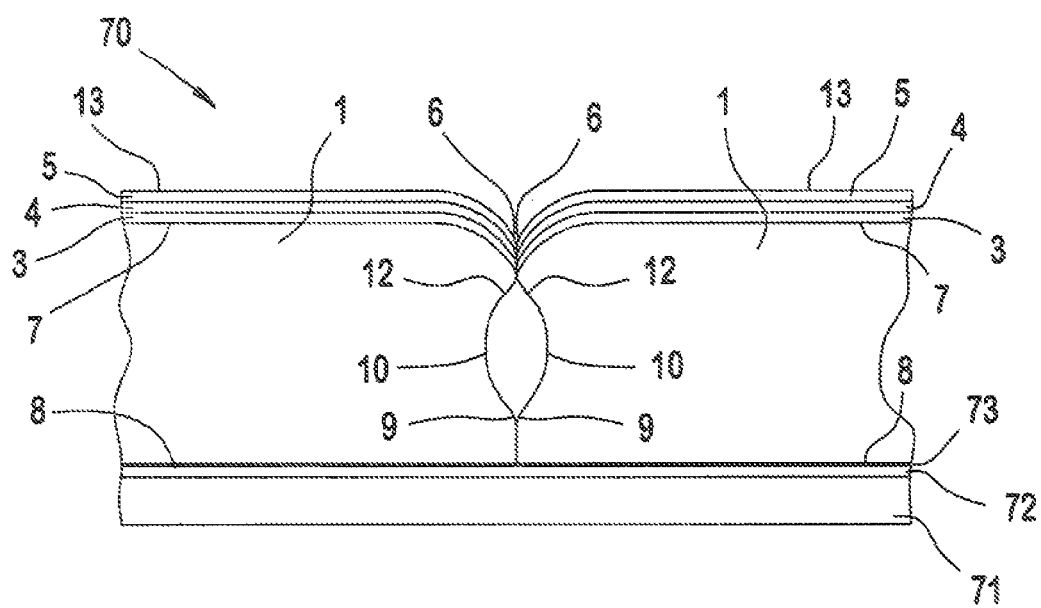
FIG. 8 is a partial plan view of an alternate embodiment of the floating floor system incorporating the resilient floor tile.

FIGS. 7-8 show a floating floor system 70 comprising a plurality of the resilient floor tiles 1 installed on a sub-floor 71. As shown in FIG. 7, a liner 72 is provided on the sub-floor 71. The liner 72 may be, for example, made from felt, vinyl, or glass and may optionally be coated or impregnated with a plastisol. The liner 72 is provided on the sub-floor 71 such that the liner 72 is not attached to the sub-floor 71 by an adhesive or any other means. An adhesive 73 is provided on a top surface of the liner 72. The resilient floor tiles 1 are then positioned on the adhesive 73 such that a space 74 is created between the side walls 8 of the adjacent resilient floor tiles 1. Grout 75 is then provided in the space 74. The grout 75 may be, for example, any conventional flooring grout. The grout 75 is provided in the space such that the grout is substantially below the upper surface 13 of the resilient floor tile. The recessed portions 10 in the side walls 9 of the resilient floor tiles 1 provide an undercut, which provides additional area for the grout 75 to bond to the side walls 9 of the resilient floor tiles 1. Thus, the floating floor system 70 has the appearance of a flooring system formed from ceramic or natural tile.

FIG. 8 shows an alternate embodiment of the floating floor system 70. As shown in FIG. 8, the resilient floor tiles 1 may alternatively be adhered to the liner 72 in a butt-fit arrangement such that the shaped edges 6 of the adjacent floor tiles 1 are positioned against each other. Additionally, instead of being installed as a floating floor system, the resilient floor tiles 1 or the liner 72 shown in FIGS. 7-8 may be alternatively adhered directly to the sub-floor 71.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A method of making a resilient floor tile, comprising
conveying a continuous sheet of a base layer into a press;
moving a press die included in the press to a closed position, the press die including a cutting tool, a forming tool and a stripper plate, the forming tool abutting the cutting tool, a clearance provided between the stripper plate and the forming tool;
cutting the continuous sheet with a blade of the cutting tool of the press die to form side walls of the resilient floor tile when the press die is actuated;

concurrently forming a shaped edge on at least a portion of a perimeter of an upper surface of the resilient floor tile with the forming tool of the press die when the press die is actuated;

returning the press die to an open position upon completion of the concurrent cutting and forming;

stripping the cut and formed resilient floor tile from the press die with the stripper plate;

moving the cut and formed resilient floor tile and an associated frame scrap from the press die; and advancing a next portion of the continuous sheet of the base layer into the press.

2. The method of claim 1, further comprising cooling the continuous sheet, to a temperature of about 135-145 degrees Fahrenheit prior to conveying the continuous sheet into the press die.

3. The method of claim 1, wherein more than one of the resilient floor tiles is cut and formed from the continuous sheet.

4. The method of claim 1, wherein the blade is inclined at an angle of about 30 degrees.

5. The method of claim 1, wherein the forming tool has a shaped surface for forming, the shaped edge.

6. The method of claim 1, wherein the shaped edge is rounded or beveled.

7. The method of claim 1, wherein the side walls has a recessed portion.

8. The method of claim 7, wherein the recessed portion has a depth of up to about 20 mils.

9. The method of claim 8, wherein the recessed portion has a depth of about 15-20 mils.

10. The method of claim 1, wherein a knife support block abuts a side of the cutting tool opposite the forming tool.

11. The method of claim 1, further comprising laminating at least one of a film layers or a decorative film layer to the base layer prior to conveying the continuous sheet into the press die.

12. The method of claim 11, further comprising providing a topcoat overtop of the at least one film layer or decorative film layer.

13. The method of claim 11, wherein the at least on film or decorative film layer extends over at least a portion of the shaped edge.

14. The method of claim 11, wherein the at least on film or decorative film aver extends over an entirety of the shaped edge.

15. The method of claim 1, wherein the base layer comprises a binder and a filler.

16. The method of claim 15, wherein the base layer comprises less than about 25% weight of the binder.

17. The method of claim 15, wherein the binder comprises a polymeric resin, a plasticizer, and a stabilizer.

18. The method of claim 17, wherein the polymeric resin comprises a homopolymer and a copolymer.

* * * * *